(12) United States Patent
Bell et al.

(10) Patent No.: US 6,446,746 B1
(45) Date of Patent: Sep. 10, 2002

(54) SUBFRAME DRIVELINE MODULE

(75) Inventors: Dale Bell, Ortonville; Christos Kyrtsos, Southfield; Christopher S. Keeney; Frank A. Palmeri, both of Troy, all of MI (US); Gerald Montgomery, Pinehurst, NC (US); Yngue Naerheim, Thousand Oaks, CA (US); Dean Molde, Pinehurst, NC (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/605,486

(22) Filed: Jun. 28, 2000

(51) Int. Cl.[7] ............................................... B62D 21/00
(52) U.S. Cl. ...................................................... 180/312
(58) Field of Search ................................ 180/311, 312, 180/337, 343, 344; 280/781, 797

(56) References Cited

U.S. PATENT DOCUMENTS

| | | | | |
|---|---|---|---|---|
| 3,806,149 A | * | 4/1974 | Huszar | 180/312 |
| 4,284,158 A | * | 8/1981 | Schield | 180/344 |
| 5,280,957 A | | 1/1994 | Hentschel et al. | 280/788 |
| 5,560,651 A | | 10/1996 | Kami et al. | 280/788 |
| 5,611,569 A | | 3/1997 | Sekiguchi et al. | 280/788 |

* cited by examiner

Primary Examiner—Brian L. Johnson
Assistant Examiner—Faye M. Fleming
(74) Attorney, Agent, or Firm—Carlson Gaskey & Olds

(57) ABSTRACT

A driveline assembly module includes a drivetrain assembly having drivetrain components such as a transmission and differential assembly integrated with a first and a second axle assembly. In one embodiment the drivetrain assembly is integral to the second axle assembly and a coupling attaches the drivetrain assembly to the first axle assembly. By mounting the driveline components, rigid axles, and suspension as an integral module, the components are replaced or serviced by replacement of the entire module. Thus, the individual mounting, replacement and servicing of the individual components, each having multiple independent attachment points, is avoided.

15 Claims, 3 Drawing Sheets

SUBFRAME DRIVELINE MODULE

BACKGROUND OF THE INVENTION

The present invention relates to a module for attachment to a vehicle frame, and more particularly to an integral module that supports a suspension and driveline system that is collectively mountable to a vehicle main frame.

A vehicle such as a tractor of a tractor trailer vehicle commonly includes a main frame having a pair of longitudinally extending members. The members support drivetrain components that provide torque and speed multiplication to the wheels as well as other features such as wheel speed differentiation, axle speed differentiation (in the case of tandem or tandem drive units), prevention of wheel speed differentiation, etc. Separate and distinct from these components is another device mounted typically to the engine which provides selective or automatic speed and torque multiplication to a drive shaft which couples to the longitudinally extending members. The individual driveline components, must therefore be separately assembled and attached to the main frame through the engine, suspended bearing mounts and a suspension system.

Unfortunately, the individual assembly and attachment of each component to the main frame is a time consuming and labor intensive process. Further, it is difficult to integrate the systems as the multiple independent attachment points prevent the systems from being installed simultaneously. Additionally, the size of a completed main frame of a tractor requires an excessive amount of space for assembly of each independent component.

SUMMARY OF THE INVENTION

The present invention provides a driveline assembly module that is previously assembled and collectively mounted to a vehicle main frame thereby reducing the number of assembly steps and contributing to an improvement in productivity, quality and serviceability.

The driveline assembly module includes a drivetrain assembly having drivetrain components such as a transmission and differential assembly integrated with an axle assembly. Other drivetrain components, such as components which provide torque and speed multiplication to the wheels as well as other features such as, auxiliary transmissions, transmission drop-boxes, wheel speed differentiation, axle speed differentiation (in the case of tandem or tandem drive units) and prevention of wheel speed differentiation may also be included within the drivetrain assembly. The module preferably includes a suspension system which supports the axle assemblies and the drivetrain assembly.

In one embodiment the drivetrain assembly is integral to a second axle assembly and a coupling attaches the drivetrain assembly to the first axle assembly. In another embodiment the drivetrain assembly and axle assemblies are incorporated in an integral housing.

By mounting the drivetrain components and associated subsystems together as a module, then mounting the module as a unit to the vehicle, the individual components can be mounted and serviced by replacement of the entire module. Thus, the individual attachment, replacement and servicing of each individual component, each previously having multiple independent attachment points for attachment to the vehicle, is avoided.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
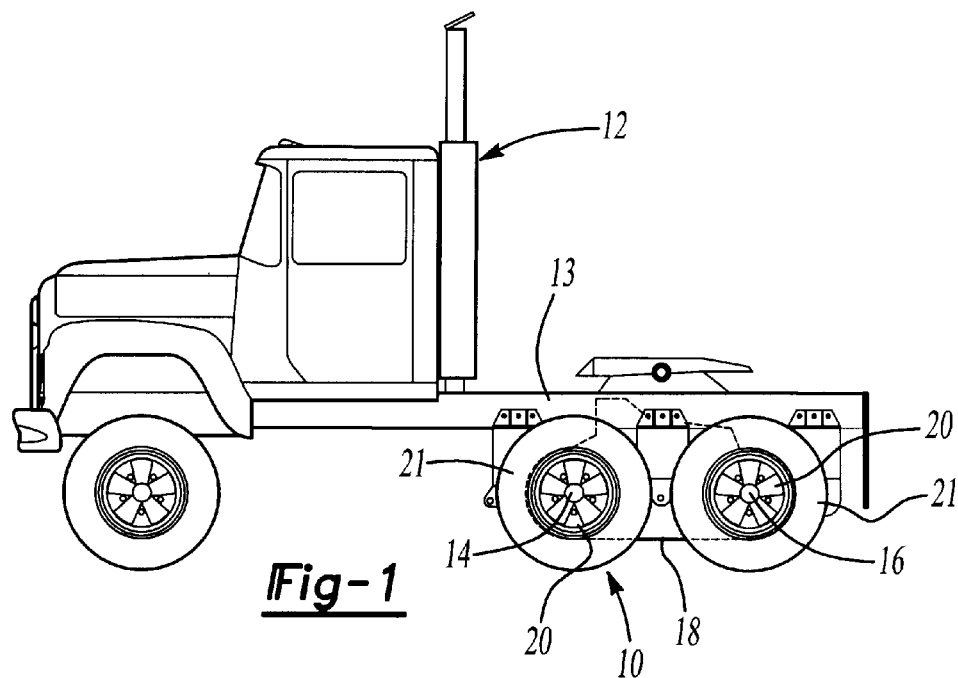
FIG. 1 is a general perspective view of a generic vehicle tractor rig for use with the present invention.

A driveline assembly module 10 of the present invention is shown in FIG. 1 mated with a generic vehicle. The vehicle 12 is preferably a self-powered vehicle such as a truck tractor which includes a longitudinal mainframe 13. However, it should be realized that many vehicles will benefit from the present invention. While the number of wheels depicted includes four wheels to each axle, it will be understood that this is consistent with standard eighteen-wheel tractor construction and that the number of axles and the number of wheels per axle can vary.

As will be further described below the module 10 is an integral unit previously assembled and collectively mounted to the longitudinal mainframe 13 of the vehicle 12. The module 10 is illustrated in the disclosed embodiment as including a rigid first axle assembly 14 and a rigid second axle assembly 16. However, it will be understood that the module 10 can be mounted to other members and at other locations. Each axle assembly 14, 16 is driven by a drivetrain assembly 18 which drives associated wheel hubs 20 and tires 21 in a known manner.

Figure 2:
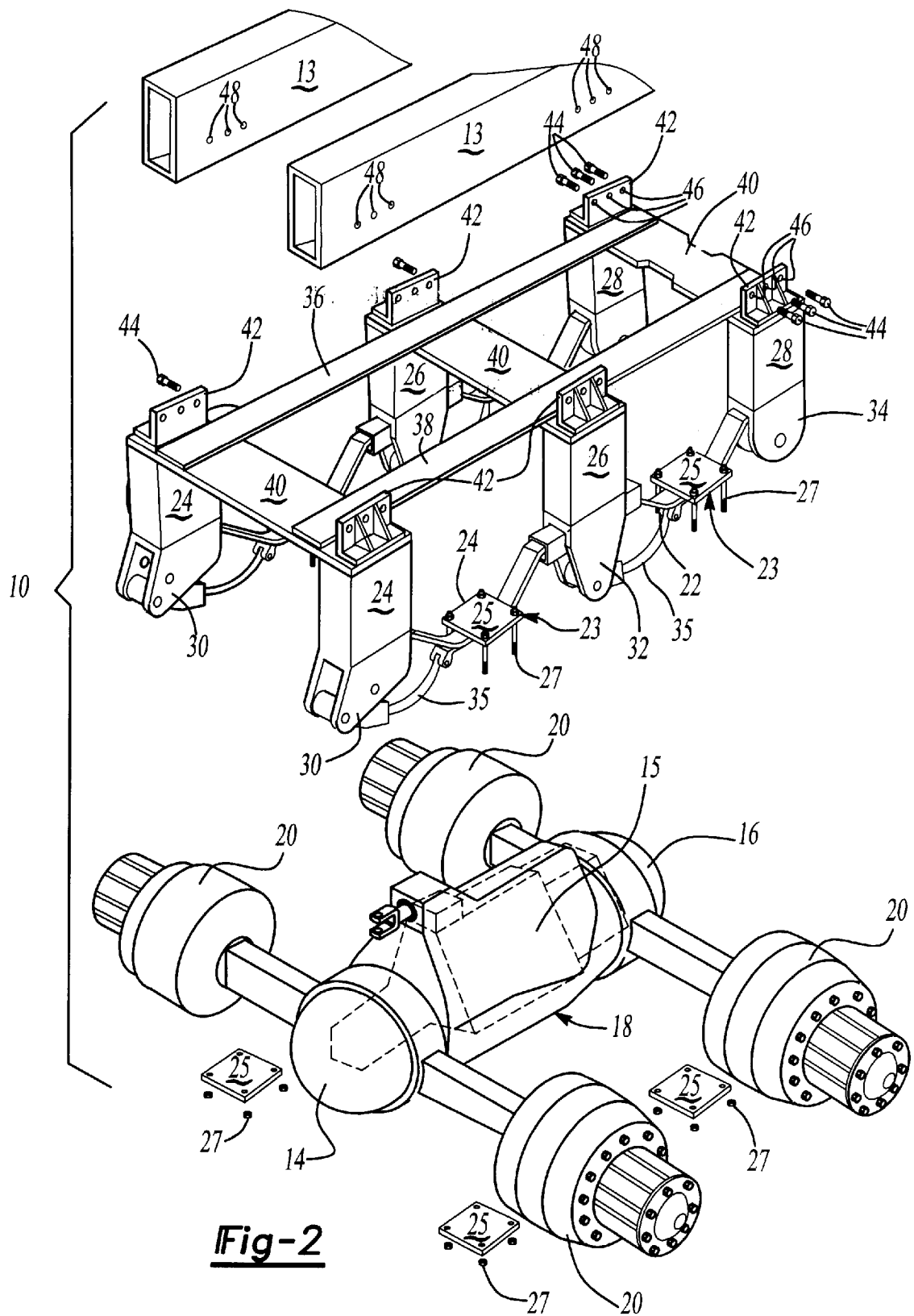
FIG. 2 is general perspective view of the present invention detached from the vehicle of FIG. 1.

Referring to FIG. 2, the module 10 includes the drivetrain assembly 18 for the vehicle 12. The drivetrain assembly 18 contains drivetrain components such as a transmission and differential assembly (shown schematically at 15) which is operably connected to the first and second axle assemblies 14,16. Other drivetrain components, such as components which provide torque and speed multiplication to the wheels as well as other features such as, auxiliary transmissions, transmission drop-boxes, wheel speed differentiation, axle speed differentiation and prevention of wheel speed differentiation may also be contained within the drivetrain assembly 18.

By integrating the drivetrain assembly 18 with the axle assemblies 14, 16, the entire vehicle 12 driveline can be independently assembled and later attached to the vehicle 12 (FIG. 1) as the module 10. Thus, the individual attachment, replacement and servicing of each individual component, each previously having multiple independent attachment points to the vehicle, is avoided.

The module 10 preferably includes a suspension system to support the axle assemblies 14,16. Bracket assemblies 23 including plates 25 and fasteners 27 or the like mount each axle assembly 14,16 to an associated spring 22. Each spring 22 is supported by vertical pillars 24,26,28 which support a front hanger bracket 30, an equalizer hanger bracket 32 and a rear hanger bracket 34, respectively. Torque arm assemblies 35 may be further provided between the hanger brackets 30, 32 and the first and second axle assemblies 14,16. It should be understood that although a particular suspension is illustrated in the disclosed embodiments, other suspension assemblies will benefit from the present invention.

A pair of longitudinal members 36, 38 having lateral cross members 40 are attached to the vertical pillars 24, 26, 28. The longitudinal members 36,38 and lateral cross members 40 preferably form a rigid, substantially box-like frame structure for the module 10. Although two longitudinal and three lateral members are illustrated in the disclosed embodiment, it will be understood that the present invention is not limited to such a configuration.

A plurality of mounts such as brackets 42 are used to mount the module 10 to the longitudinal mainframe 13. The brackets 42 are attached to the mainframe 13 by fasteners such as bolts 44 or the like which fit within corresponding apertures 46 in the brackets 42 and are received within corresponding apertures 48 in the longitudinal mainframe 13. The brackets 42 and fasteners allow the detachable mounting of the module 10 to the vehicle 12. Although brackets 42 are disclosed, it will be understood that other mountings can be used.

Figure 3A:
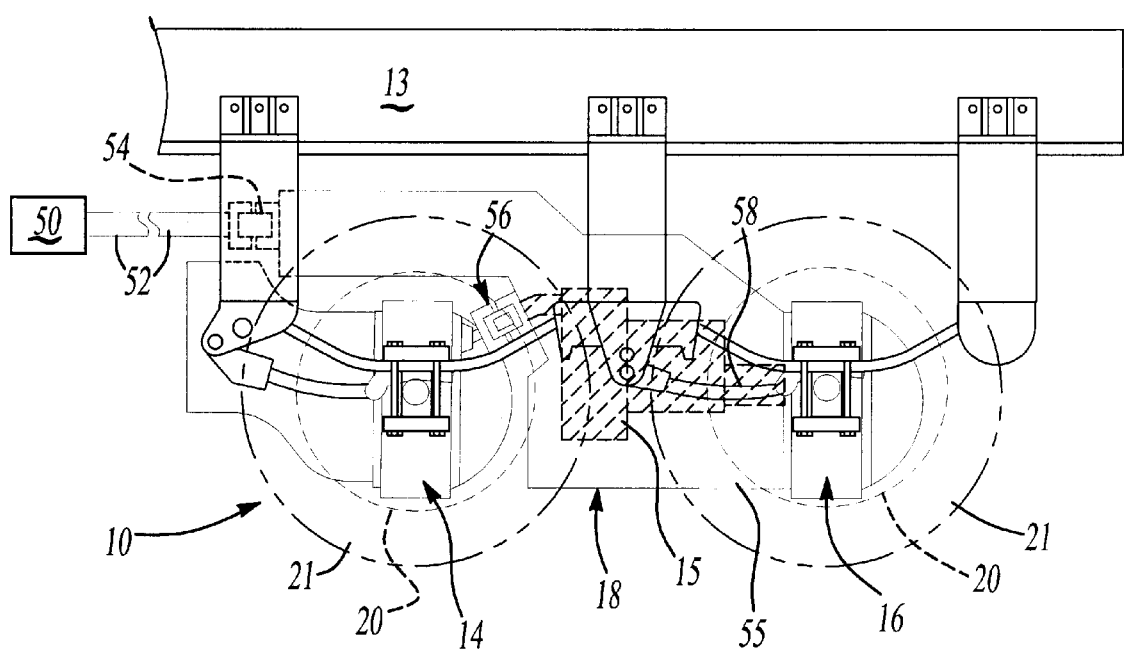
FIG. 3A is partial phantom side view of the module of FIG. 2.

Referring to FIG. 3A, the drivetrain assembly 18 is connected to an engine (shown schematically at 50) through a drive shaft 52 or the like. Preferably, a coupling 54 connects the drivetrain assembly 18 to the drive shaft 52 and engine 50. The drivetrain assembly 18 transfers the motive force from the drive shaft 52 to each axle assembly 14, 16 which drive the hubs 20 and tires 21 (FIG. 1).

Notably, the drivetrain assembly 18 is attached between the axle assemblies 14, 16 and not to the vehicle engine 50. The drivetrain assembly thereby locates the previously remotely located drivetrain components such as the transmission and differential assemblies 15 adjacent the axle assemblies 14,16. By mounting the drivetrain assembly 18 on the module 10, the heretofore individual components can be mounted, replaced and serviced by replacement of the entire module 10.

A coupling 56, such as yoke assemblies, U-joints or the like attach the drivetrain assembly 18 to the first axle assembly 14. In this disclosed embodiment the drivetrain assembly 18 is integral to the second axle assembly 16 housing 55. Preferably, an internal coupling (shown schematically at 58) is provided within the housing 55 to attach the transmission and differential assemblies 15 within the drivetrain assembly 18 to the second axle assembly 16. The internal coupling 58 may be accomplished by a coupling such as coupling 56 or may be accomplished by gearing or the like The coupling 56 provides for relative movement between each axle assembly 14,16 while allowing the motive force from the drive shaft 52 and drivetrain assembly 18 to be transferred to each axle assemblies 14, 16.

Figure 3B:
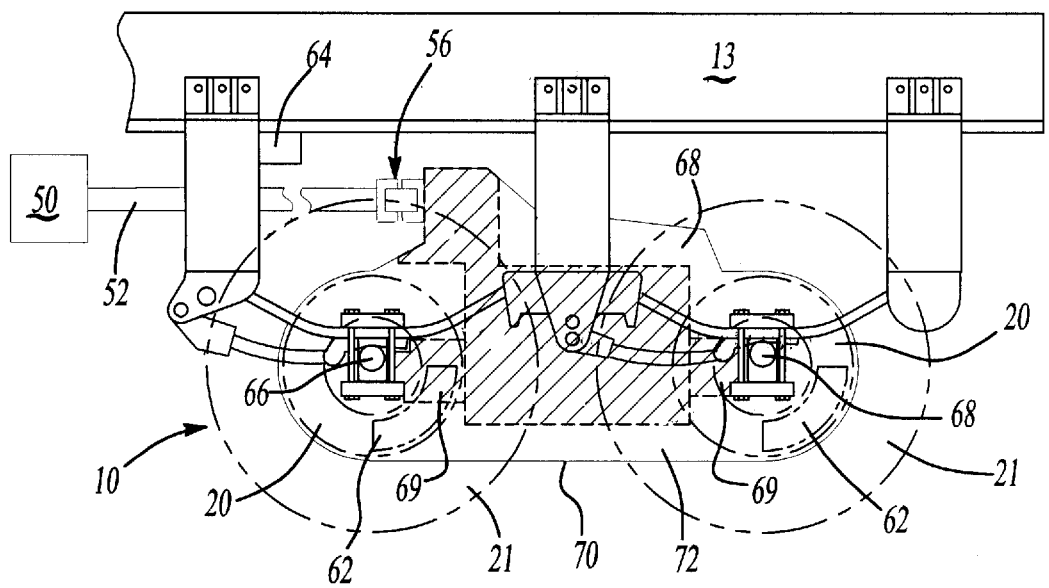
FIG. 3B is partial phantom side view of an alternate embodiment of a module designed according to the present invention.

Referring to FIG. 3B, a first and second axle assembly 66, 68 and a drivetrain assembly 70 are incorporated into a single integral unit 72. In this embodiment, the drivetrain assembly 70 internally contains the transmission, differential, and other drivetrain assemblies (schematically illustrated at 68) along with the necessary couplings (schematically illustrated at 69) to the axle assemblies 66,68. Although the integral unit 72 may be mechanically more simple, individual movement of each axle assembly 66, 68 will be accordingly limited.

Further, other sub-systems such as a brake system (shown somewhat schematically at 62) are provided for each hub 20 and may also be mounted to the module 10. Other sub-system components, such as a brake air supply reservoir 64, may also be attached to the module 10. The module 10 thereby supports and connects each individual axle assembly 14, 16 with the drivetrain components and sub-systems required for a vehicle drivetrain.

The foregoing description is exemplary rather than limiting in nature. Many modifications and variations of the present invention are possible in light of the above teachings. The preferred embodiments of this invention have been disclosed, however, one of ordinary skill in the art would recognize that certain modifications are possible that would come within. the scope of this invention. It is, therefore, to be understood that within the scope of the appended claims, the invention may be practiced otherwise than as specifically described. For that reason the following claims should be studied to determine the true scope of protection given for this invention.

What is claimed is:

1. A driveline assembly module, comprising:

a drivetrain assembly within a housing; and a suspension system to support an axle assembly, said axle assembly operably attached to said drivetrain assembly and extending from said housing;

whereby said housing is detachably mountable to said suspension system.

2. The module of claim 1, wherein said drivetrain assembly is integral to said axle assembly.

3. The module of claim 1, wherein said drivetrain assembly is operably attached to a second axle assembly.

4. The module of claim 3, wherein said first axle assembly and said second axle assembly extend from said housing.

5. The module of claim 3, wherein said second axle assembly is articutable relative to said housing to provide relative movement between each axle assembly.

6. The module of claim 1, wherein said drivetrain assembly includes a transmission.

7. The module of claim 1, wherein said drivetrain assembly includes a differential.

8. The module of claim 1, wherein said drivetrain assembly includes a coupling attachable to a drive shaft attached to an engine.

9. A driveline assembly module, comprising:

a drivetrain assembly including a transmission within a housing; and a suspension system to support a first and a second rigid axle assembly, said first and said second axle assembly operably attached to said drivetrain assembly and said second axle assembly extending from said housing;

whereby said housing is detachably mountable to said suspension system.

10. The module of claim 9, wherein said drivetrain assembly includes a coupling attachable to a drive shaft of an engine.

11. The module of claim 9, wherein said drivetrain assembly and said second axle assembly are incorporated in an integral housing.

12. The module of claim 9, wherein said drivetrain assembly includes a coupling attachable to said first axle assembly.

13. The module of claim 9, wherein said first axle articulates relative to said housing to provide relative movement between each axle assembly.

14. A driveline assembly module, comprising:

a drivetrain assembly including a transmission and a differential within a housing;

a suspension system to support a first and a second rigid axle assembly, said first and said second axle assembly operably attached to said drivetrain assembly and extending from said housing; and a coupling extending from said drivetrain assembly, said coupling attachable to a drive shaft of an engine;

whereby said housing is detachably mountable to said suspension system.

15. The module of claim 14, wherein said housing articulates as a unit upon said suspension system.

* * * * *

UNITED STATES PATENT AND TRADEMARK OFFICE
CERTIFICATE OF CORRECTION

PATENT NO.    : 6,446,746 B1
DATED         : September 10, 2002
INVENTOR(S)   : Bell et al.

It is certified that error appears in the above-identified patent and that said Letters Patent is hereby corrected as shown below:

<u>Title page,</u>
Item [75], "Yngue Naerheim" should be -- Yngve Naerheim --

Signed and Sealed this

Twenty-fifth Day of February, 2003

JAMES E. ROGAN
*Director of the United States Patent and Trademark Office*